May 9, 1933.  J. P. THOMPSON  1,908,081
SCREW DRIVER
Filed June 17, 1932
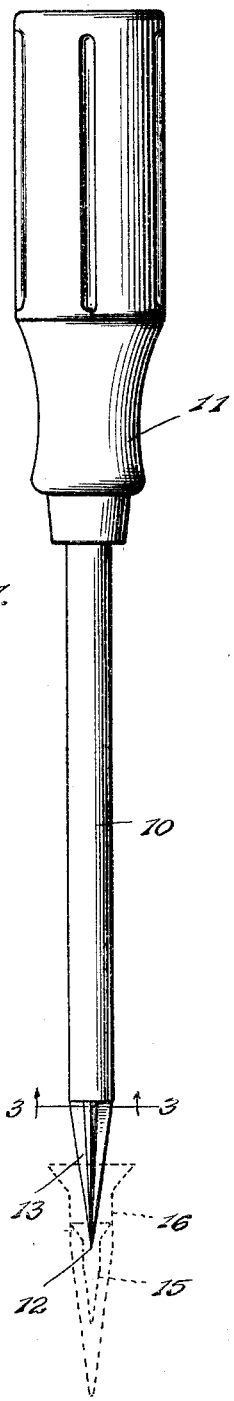
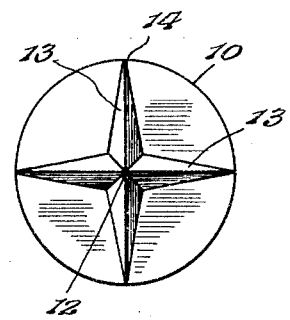
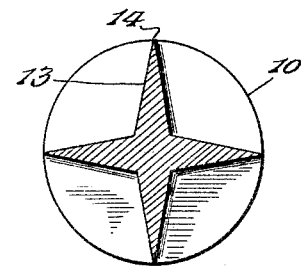
Inventor
J. P. Thompson.
By Lacey+Lacey, Attorneys Patented May 9, 1933

1,908,081

UNITED STATES PATENT OFFICE

JOHN P. THOMPSON, OF PORTLAND, OREGON, ASSIGNOR, BY DIRECT AND MESNE ASSIGNMENTS, TO H. F. PHILLIPS, OF PORTLAND, OREGON

SCREW DRIVER

Application filed June 17, 1932. Serial No. 617,841.

This invention relates to screw drivers, and has for an object to provide a screw driver particularly adapted to drive all sizes of screws of that type described in my co-pending application filed May 20, 1932, Serial No. 612,555, in which a screw is shown having a cruciform groove which tapers not only from top to bottom, but also tapers from the axis of the screw radially outward to the points of the groove.

A further object of this invention is to provide a screw driver having a bit or working end which tapers to a point and in the tapered area is provided with four ribs which taper radially to their points, this novel working end of the screw driver being adapted to enter the cruciform groove of all sizes of screws for driving the screws.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification.

Figure 1 is a side elevation of a screw driver constructed in accordance with the invention and showing in dotted lines two screws of different sizes applied thereto, Figure 2 is an enlarged bottom plan view of the screw driver with the handle removed, and Figure 3 is an enlarged cross section taken on the line 3—3 of Figure 1 with the handle removed.

Referring now to the drawing in which like characters of reference designate similar parts in the various views, the screw driver is shown to comprise a shank 10 which is equipped at one end with a grip or handle 11 of the usual and well known type. The shank is cylindrical in cross section and at the working end thereof is tapered to a point 12 on the longitudinal axis of the shank.

The pointed tapered portion of the working end of the shank is provided with a plurality of V-shaped grooves, the side faces of contiguous grooves forming, by way of example, four ribs 13 of substantially triangular cross section, as shown best in Figure 3. Each rib may be said to taper from the surface of the shank 10 downwardly to the point 12 and also to taper in a radial direction from the axis of the shank to the extreme knife edge 14. The superficial area occupied by the ribs will vary according to the size of the screw driver. Specifically, the side faces of each rib converge downwardly in the direction of their length to the extreme point on the axis of the shank and converge radially in the direction of their width to a knife edge. In the preferred embodiment, the knife edges of all the ribs converge at like angles to a common terminal point on the axis of the shank.

As shown in Figure 1, the screw driver may be used to drive screws of relatively small size, as shown at 15, as well as screws of relatively large size, as shown at 16, the pointed ribbed working end of the shank penetrating only a short distance into the cruciform groove of the small screw, but penetrating a greater distance into the cruciform groove in the large screw. Thus a single screw driver may be employed to drive all sizes of screws since the cruciform grooves in the screws are of identical taper and merely differ in length according to the length of the screw, as will be understood. A punch for punching screw driver receiving grooves in the head of a screw may be formed identically as above described.

It is thought that from the above description the construction and operation of my invention will be fully understood without further explanation.

What is claimed is:

1. A screw driver having a cylindrical shank tapered at the working end and terminating in a point, and four equally spaced ribs on the tapered portion of the shank, said ribs being substantially triangular in cross section and tapering radially from the axis of the screw driver to their outer edges.

2. A tool of the class described comprising a shank tapered and ribbed for a portion of its length, the side walls of each rib converging radially in the direction of their width to substantially a knife edge and converging downwardly in the direction of their length toward a point on the axis of the shank.

3. A tool of the class described comprising a shank tapered for a portion of its length at one end thereof, said tapered portion being formed with radial ribs, the side walls of which converge outward to knife edges which converge downwardly at like angles to a common point on the axis of the shank.

4. A tool of the class described comprising a shank tapered at one end, said tapered end being provided with a plurality of substantially V-shaped grooves, the side faces of contiguous grooves forming ribs terminating in knife edges which converge to a point on the longitudinal axis of the shank.

5. A tool of the class described comprising a shank tapered at one end to a point on the longitudinal axis thereof, said tapered portion being formed with a plurality of substantially V-shaped grooves, the side walls of which form ribs having cutting edges converging to said point and which are adapted to form a winged incision upon advancement of the tool.

6. A tool of the class described comprising a shank tapered and formed with slender ribs for a portion of its length, the side walls of each rib converging radially in the direction of their width to a common edge and converging downwardly in the direction of their length toward a point on the axis of the shank.

In testimony whereof I affix my signature.

JOHN P. THOMPSON.